Sept. 7, 1926.
C. HENDERSON
CONNECTING BAR FOR DENTURES
Filed Sept. 21, 1923
1,599,361
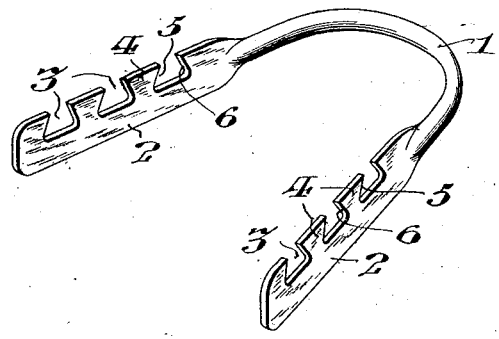
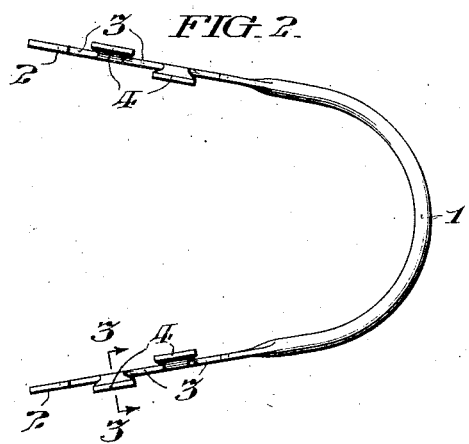
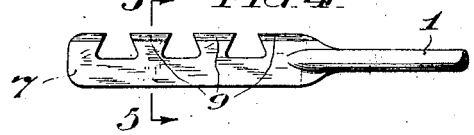
Inventor
Charles Henderson,
By Clifton E Hallowell
Attorney Patented Sept. 7, 1926.

1,599,361

UNITED STATES PATENT OFFICE.

CHARLES HENDERSON, OF LANSDOWNE, PENNSYLVANIA, ASSIGNOR TO THE S. S. WHITE DENTAL MANUFACTURING COMPANY, A CORPORATION OF PENNSYLVANIA.

CONNECTING BAR FOR DENTURES.

Application filed September 21, 1923. Serial No. 663,947.

My invention relates particularly to lingual or palatal bars that are designed to connect partial dentures, which are disposed upon opposite sides of the mouth, and is especially directed to the form of the bar terminal attachments with which said dentures are to be engaged.

The principal objects of my invention are to provide a denture connecting bar with denture attaching terminals so formed as to not only afford means for providing rigid attachment for the plastic material forming the denture, but which also affords a construction whereby said plastic material may be readily packed into the interstices provided to receive it.

Other objects of my invention are to provide a denture connecting bar having its denture attaching terminals so formed as to be capable of attachment with dentures composed of either plastic material or of metal with equal facility.

My invention comprehends a denture connecting bar having denture attaching terminals that may be readily modified by the operator to conform to specific conditions that may be encountered.

Specifically stated, the form of my invention as hereinafter described, comprises a denture connecting bar of any desired cross-section, having its medial arch bowed to conform generally to the medial arch of the human mandible, and its terminal portions extended to conform to the lateral extremities of said arch and flattened to form terminal webs arranged to be attached to the dentures, and having their edges provided with dovetail-shaped notches affording similarly shaped intervening tongues, to insure rigid engagement of said dentures therewith.

My invention also includes all of the various novel features of construction and arrangement as hereinafter more definitely specified.

In the accompanying drawings, Figure 1 is a perspective view of a denture connecting bar constructed in accordance with my invention; Fig. 2 is a plan view of said denture connecting bar showing a possible modification thereof; Fig. 3 is a transverse vertical sectional view of the denture attaching terminals of the bar shown in Fig. 2, taken on the line 3—3 in said figures; Fig. 4 is a side elevational view of a denture connecting bar embodying a modified form of denture attaching terminal; and Fig. 5 is a transverse vertical sectional view of the structure shown in Fig. 4, taken on the line 5—5 in said figure.

In the form of my invention shown in Fig. 1, the denture connecting bar 1 may be of any desired cross-section, preferably lentiform or ovalescent and bowed to substantially conform to the medial region of the dental arch of the human mandible, being provided with denture attaching terminal webs 2 diverging distally and arranged to be embedded in, or otherwise attached to, the saddle portion of dentures of well-known form, which may be composed of vulcanite, metal or other suitable material.

Said denture attaching terminal webs 2 are provided along one of their edges with dovetail-shaped recesses or indentures 3, forming relatively inverted similarly shaped tongues 4 providing undercut edges 5 and 6 which afford means for retaining the terminals 2 in rigid engagement with the dentures which are to be connected by the denture connecting bar 1.

It may be practical, and in some cases desirable, to distort the tongues 4 laterally outward or inward, or alternately outward and inward, as shown in Figs. 2 and 3, to increase the retentive effect of said tongues. This is particularly advantageous in the use of the denture connecting bar in its employment with vulcanite dentures.

In the form of my invention shown in Figs. 4 and 5, the recessed or indented edge of the denture attaching terminal web 7, may be thickened laterally to provide the overhanging flanges 8 and 9, which, as shown in Fig. 5, generally conform in cross-section to the conventional dovetail, but which obviously may be variously shaped as desired.

My invention is advantageous in that the tongues 4, which afford the retention, may be extended in the plane of the body of the terminal webs 2, as shown in Fig. 1, in which form the bar is especially adapted to be soldered to a metal denture, or said tongues may be distorted laterally, as shown in Figs. 2 and 3, to any desired degree conformable to each particular denture of vulcanite or other material, as desired.

I do not desire to limit my invention to the precise details of construction and arrangement as herein set forth, as it is obvious that various modifications may be made therein without departing from the essential features of my invention as defined in the appended claims.

Having thus described my invention, I claim:

1. A device of the class described, comprising a bendable bar terminating in flat webs, the edges of which are indented to form dovetail-shaped tongues, and similarly shaped relatively inverted recesses.

2. A lingual bar having flat ends, one edge of each of said ends being notched to form teeth, said teeth being bent alternately in opposite lateral directions.

3. A lingual bar having flat ends, one edge of each of said ends being cut to form teeth, said teeth being bent alternately in opposite lateral directions.

4. A lingual bar having flat ends, the edge of each of which is formed with relatively severed teeth extended alternately in opposite lateral directions.

In witness whereof, I have hereunto set my hand this 17th day of September, A. D., 1923.

CHARLES HENDERSON.